Jan. 2, 1962

G. A. LYON 3,015,352

APPARATUS FOR MAKING WHEEL COVERS

Original Filed Feb. 17, 1956

Inventor
George Albert Lyon
by Hill, Sherman, Meroni, Gross & Simpson Attys

Jan. 2, 1962  G. A. LYON  3,015,352
APPARATUS FOR MAKING WHEEL COVERS
Original Filed Feb. 17, 1956  2 Sheets-Sheet 2
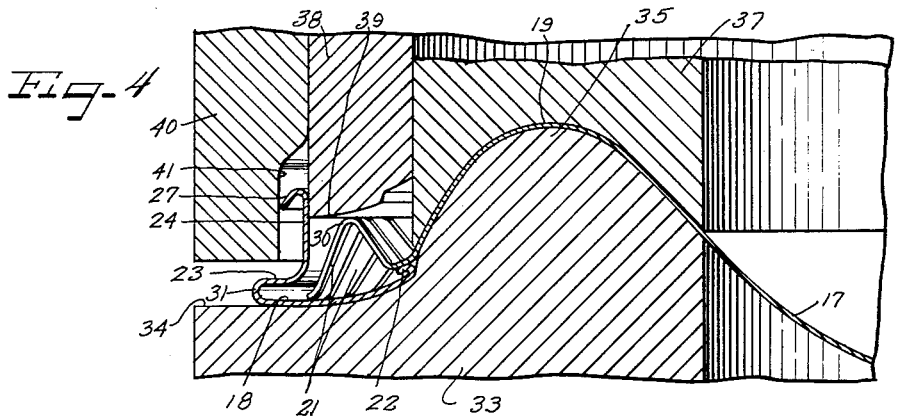
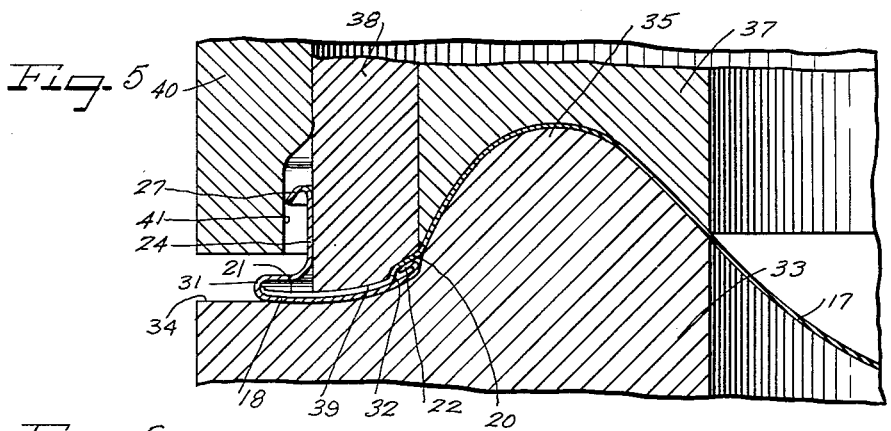
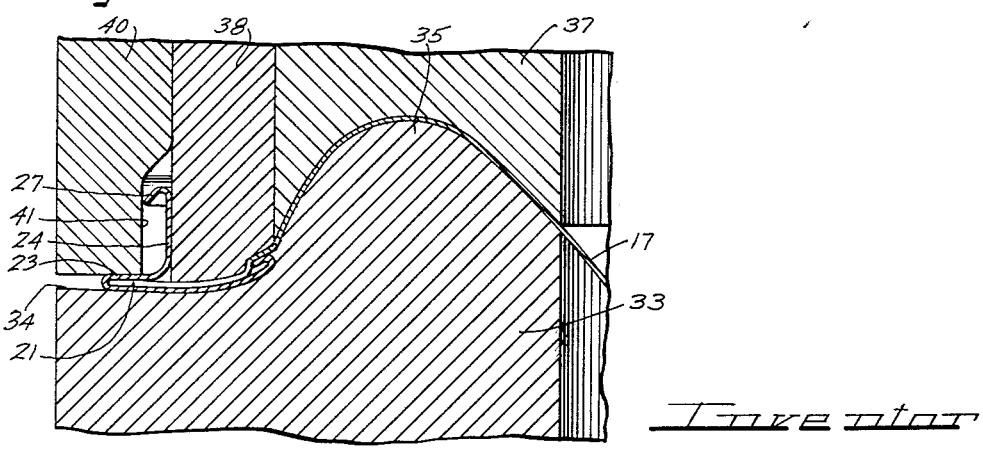
Inventor
George Albert Lyon

United States Patent Office 3,015,352
Patented Jan. 2, 1962

3,015,352
APPARATUS FOR MAKING WHEEL COVERS
George Albert Lyon, Detroit, Mich., assignor to Lyon Incorporated, Detroit, Mich., a corporation of Delaware
Original application Feb. 17, 1956, Ser. No. 566,229. Divided and this application Sept. 2, 1958, Ser. No. 758,288
3 Claims. (Cl. 153—1)

The present invention relates to improvements in apparatus for making wheel covers, and more particularly for making composite assemblies of wheel cover components.

This application is a division of my application Serial No. 566,229 filed February 17, 1956.

Certain material such as sheet aluminum lend themselves well to novel ornamental effects in a wheel cover but, on the other hand, may be too soft, in at least certain grades thereof, to secure sufficient resilience or stiffness therein for retaining interengagement with a wheel. For example, anodized aluminum, or otherwise surface treated aluminum affords desirable colors in a selection of shades of which it may be desirable to provide in wheel covers consonant with or in contrast to the finish color or combinations or color of vehicles such as automobiles. Yet it is desirable that the covers be readily applicable to the vehicle wheels by press-on, pry-off retaining means such to be most effective should comprise a work hardenable material of better work hardenable characteristics than aluminum. Such a material may be stainless steel or brass, by way of example.

It is accordingly an important object of the present invention to provide improved apparatus for making wheel covers of composite structure.

Another object of the invention is to provide novel apparatus for uniting components of a composite wheel cover structure wherein a central cover component of one material is to be united with an annular outer peripheral retaining ring member.

A further object of the invention is to unite cover components wherein one of the components is provided with bendable fingers to be interlockingly united with another of the cover components.

Other objects, features and advantages of the present invention will be readily apparent from the following detailed description of a preferred embodiment thereof taken in conjunction with the accompanying drawings in which:

FIGURE 4 is a fragmentary vertical sectional detail view through a die assembly for securing components of the cover together and showing the elements of the die assembly in one preliminary relative operational relationship;

FIGURE 5 is a sectional detail view similar to FIGURE 4 but showing the components of the die assembly in a further operational relationship; and FIGURE 6 is a similar sectional view showing the components of the die assembly in the final stage or relationship wherein assembly of the cover components has been completed.

Figure 2:
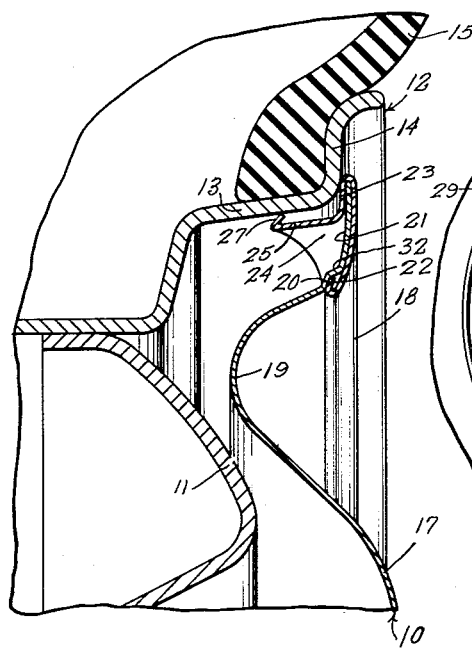
FIGURE 2 is a fragmentary radial sectional detail view taken substantially on the line II—II of FIGURE 1 and on an enlarged scale.
Figure 1:
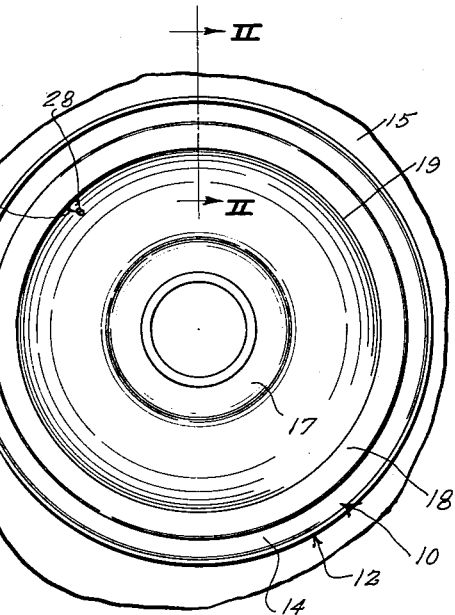
FIGURE 1 is an outer side elevational view of a vehicle wheel structure embodying features of the invention.
Figure 3:
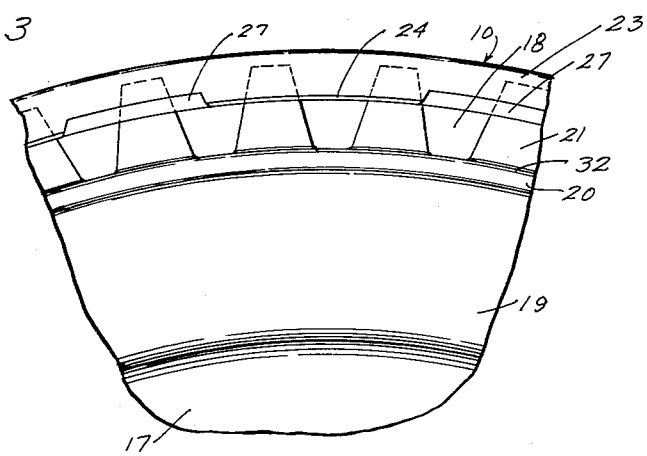
FIGURE 3 is a fragmentary rear elevational view of the cover of FIGURES 1 and 2.

A wheel cover 10 (FIGS. 1, 2 and 3) embodying features of the invention is constructed and arranged for disposition in ornamental and protective relation at the outer side of a vehicle wheel including a wheel body 11 and a tire rim 12 supported thereby and including an intermediate generally radially inwardly facing annular axially outwardly directed flange 13 merging with a terminal flange 14 and constructed and arranged to support a pneumatic tire 15.

According to the present invention, the wheel cover 10 includes a generally circular body member 17 and a circular supporting and cover retaining ring member 18. The two cover members or components are secured together in a composite, permanent assembly and are adapted for ready press-on, pry-off disposition at the outer side of the wheel. The circular cover member 17 may be made from a material of ornamental characteristic such as aluminum that has been anodized or otherwise appropriately colored, while the supporting and retaining ring 18 may be made from suitable stainless steel or brass. Although the cover member 17 may be a ring to cooperate with a central hub cap, in the present instance it is in the form of a disk dimensioned to overlie the wheel body 11 and to substantially overlie the tire rim 12.

The circular cover body 17 may be stamped or drawn to shape, with a central crown portion merging into an intermediate annular dished portion 19 leading at its radially outer side into a stepped annular marginal flange portion 20 from which project a series of radially extending circumferentially spaced interlock tabs or fingers or flange extensions 21 which interengage with the ring member 28, which overlies the same concealingly.

Herein, the ring member 18 is of a diameter to overlie the tire rim and more particularly the intermediate flange 13 thereof, having an inner underturned reinforcing and finishing flange 22 which in the assembly is arranged to seat snugly against the ledge or step provided by the marginal cover flange 20. At its radially outer margin the ring member 18 is provided with an underturned annular flange 23 between which and the body of the member 18 the radially outer end portions of the interlock extensions 21 are clamped. In addition, the underturned flange 23 affords a seat bottoming against the radially inner portion of the terminal flange 14 of the wheel rim.

Furthermore, the underturned flange 23 is provided with cover retaining means which may be substantially like the cover retaining means disclosed in my U.S. Patent 2,624,634 dated January 6, 1953. To this end, the underturned flange 23 is provided with an axially inwardly directed continuous annular flange extension 24 of a diameter to fit in freely spaced relation telescopically within the axially outer portion of the intermediate flange 13 of the tire rim. From the axial flange 24 extends a suitable series such as 8 to 16 cover retaining fingers 25 each provided with a short and stiff generally radially and axially outwardly oblique retaining terminal 27 which is engageable in retaining gripping edgewise relation with the intermediate flange 13 under resilient tension thrust imparted by the retaining fingers 25 and the axial flange 24 coacting for this purpose.

For applying the cover 10 to the outer side of the wheel, a valve stem 28 is registered through a suitable valve stem opening 29 in the intermediate dished portion 19 of the cover body and the cover is then pressed axially inwardly to engage the retaining fingers 25 with the tire rim until the underturned marginal flange 23 seats against the tire rim. For removing the cover from the wheel, a pry-off tool may be applied behind the reinforced marginal flange 23 of the ring member 18 and pry-off leverage applied to disengage the retaining fingers 25 from the tire rim.

In a desirable construction, the ring member 18 of the cover assembly may be made as a rolled section from suitable strip stock such as stainless steel or brass.

A substantially concentric relationship is assured by pressing the juncture portions of the interlock fingers 21 with the flange 20 into locking shoulders 32 coactive with the edge of the underturned inner marginal flange 22.

Interlocking of the retaining interlock finger flanges 21 with the supporting and retaining ring 18 may be effected in die apparatus substantially as depicted in FIGURES 4 through 6. In such die a supporting die member 33 may be supported on the anvil of a press and has an annular seating recess 34 upon which the ring member 18 is adapted to rest in inverted position. Radially inwardly from the receiving seat 34, the supporting die member 33 has an annular ridge 35 conformed to receive snugly thereover the inverted annular intermediate dished portion 19 of the cover member 17, with the annular stepped flange 20 substantially bottoming on the turned flange 22 at the radially inner margin of the ring member 18. In this relationship the drawn up retaining flange extensions 21 are in position to be driven into the radially inwardly opening socket groove 31 of the ring member.

An upper die assembly which is adapted to be supported by a suitable ram structure of a die press includes a hold down ring 37 engageable over the die ridge 35 to clamp the cover portion 19 thereagainst and to hold the cover portion 19 against shifting or buckling incident to pressing of the retaining extension flanges 21 by means of a reciprocable ring die member 38 which is preferably operable following clamping action of the hold down die member 37. On its lower face the push down or pressure die ring member 38 is preferably contoured so as not only to substantially straighten out the connecting flange extensions 21 but also to iron the same as nearly as practicable flush against the opposing face of the ring member 18, and to shape the shoulder 32 incident to such ironing operation (FIG. 5).

Although the ring member socket groove 31 may be slightly undersize in width so as to receive the tip end portions of the interlock flanges 21 with a tight press fit, alternatively the socket groove may be oversize in width as shown in FIGS. 4 and 5, whereby to receive the tip end portions of the interlock flanges 21 freely as they are radially outwardly projected incident to straightening out of the flange extensions as by means of the die ring member 38. Where the oversize socket groove is preferred, a closing or compressing die ring member 40 may be provided which is operable sequentially following the pressing action of the die ring 38, as shown in FIGURE 6 to collapse the reverse bent flange 23 tightly into clamping relation to the opposing end portions of the interlock flange extensions 21.

For retaining the axial finger flange 24 and the retaining fingers 25 against distortion incident to the squeezing down or collapsing of the flange 23, the radially outer periphery of the pressed down ring die 38 provides a cylindrical back up surface for the axial flange 24 and the fingers. In addition, the radially inner lower marginal portion of the collapsing die 40 is provided with an annular clearance groove 41 within which the retaining finger terminals 27 are accommodated and restrained against any tendency to buckle, twist or shift radially outwardly during the groove socket closing pressing operation.

Following completion of the pressing operation, the ring die members 40 and 38 are backed off clear from the cover while the hold down die member 37 serves as a hold down or stripper, and then the hold down member 37 is backed off so that the cover assembly can be removed from the die member 33 and a succeeding assembly to be secured together assembled thereon.

It will be understood that modifications and variations may be effected without departing from the scope of the novel concepts of the present invention.

I claim as my invention:

1. In cover making apparatus, a supporting die member having an annular centering groove receptive of a cover ring component which has a generally radially extending body portion with an outer marginal overturned flange providing a radially inwardly opening groove and an upstanding retaining means flange, said supporting die member also having radially inwardly from said groove a supporting portion for internesting with a cover body component provided with a peripheral series of marginal tabs of an over-all length to extend into said ring groove but initially bent up to have the tips of the tabs on a smaller diameter than said upstanding retaining means flange so as to fit therein in overlying relation to the ring body disposed within said die member groove, a reciprocable hold down die member for clamping the cover body upon said internesting portion of the supporting die member, a relatively reciprocable pressure die member for pressing against the bent up marginal retaining tabs to drive the same against the ring member body and to straighten the same into projecting relation within the ring groove, and a third reciprocable die member for movement into compressing relation to the overturned flange of the ring member after the tabs have been driven into the ring member groove for thereby locking the tabs therein, said third reciprocable die member having a radially inwardly facing clearance groove for clearing said upstanding retaining means flange, said pressure die member having a radially outwardly facing back-up surface for engagement by said retaining means flange to retain the same against distortion during compression of said overturned flange by said third die member.

2. In apparatus for securing into assembly a cover retaining ring and a cover plate and wherein the ring has a generally radially extending annular flange body with a radially outer overturned annular flange providing with the body flange a radially inwardly opening groove and the cover plate has a radially outer marginal peripheral series of tabs of an over-all length to extend into said ring groove but initially bent up to have the tips of the tabs on a smaller diameter than the radially inner diameter of said turned over ring flange to enable assembling of the plate with the ring by relative axial movement to bring said tabs into overlying relation to the ring body with the terminals of the tabs projecting toward said ring groove, a supporting die having an upwardly opening annular groove complementary to and receptive of said ring body, said groove being defined by a centering shoulder arranged to oppose an edge of the ring body to facilitate centered placement of the ring upon the supporting die, said supporting die having radially inwardly from said groove a circular supporting surface complementary to and receptive thereon of the cover plate when the cover plate is placed in position thereon with the tabs overlying said ring body, a reciprocable hold-down die member operable to clamp the cover plate against said plate-receiving portion of the supporting die, said hold-down die member being of an outside diameter smaller than said suporting die groove so as to leave said tabs free radially outwardly beyond the hold-down die member, and a pressure die member located about the outside diameter of said hold-down die member and reciprocable relative thereto toward said supporting die groove and operable after the hold-down die member has clamped the cover plate against said plate-supporting portion of the supporting die to press said tabs against the ring body and straighten the tabs to drive the terminals of the tabs into the ring groove.

3. Apparatus as defined in claim 2 wherein said pressure die member has on the radially inner margin of its downwardly facing surface an annular groove with the remainder of the downwardly facing surface offset downwardly relative to the groove and operable during the tab-straightening operation to bend the radially inner portions of the tabs downwardly relative to the adjacent portion of the cover plate to effect an interlock with the edge of a turned over narrow inner marginal finishing flange of the ring body.

(References on following page)

References Cited in the file of this patent

UNITED STATES PATENTS

| | | |
|---|---|---|
| 1,590,749 | Hulbert | June 29, 1926 |
| 1,590,757 | Hulbert | June 29, 1926 |
| 2,162,731 | Lyon | June 20, 1939 |
| 2,378,982 | Chesny | June 26, 1945 |
| 2,844,115 | Lyon | July 22, 1958 |
| 2,847,052 | Hardman | Aug. 12, 1958 |

FOREIGN PATENTS

| | | |
|---|---|---|
| 639,198 | Germany | Nov. 30, 1936 |
| 644,902 | Germany | May 15, 1937 |
| 658,442 | Germany | Apr. 4, 1938 |